United States Patent [19]
Kiuchi et al.

[11] Patent Number: 5,527,502
[45] Date of Patent: Jun. 18, 1996

[54] METHOD FOR PRODUCING A METAL ELEMENTS-RESIN INSERT, A CONNECTOR BLOCK FOR INJECTORS, AND A METHOD FOR PRODUCING THE CONNECTOR BLOCK

[75] Inventors: Hideo Kiuchi, Aichi-ken; Mitsuhiro Fujitani; Akira Nabeshima, both of Mie-ken, all of Japan

[73] Assignees: Sumitomo Wiring Systems, Ltd., Yokkaichi; Nippondenso Co., Ltd., Kariya, both of Japan

[21] Appl. No.: 257,447

[22] Filed: Jun. 8, 1994

Related U.S. Application Data

[63] Continuation of Ser. No. 825,594, Jan. 24, 1992, abandoned.

[30] Foreign Application Priority Data

Feb. 18, 1991 [JP] Japan ..................................... 3-045952

[51] Int. Cl.⁶ .......................... B29C 45/14; B29C 70/70
[52] U.S. Cl. .......................... 264/250; 264/255; 264/263; 264/274; 264/277
[58] Field of Search .................... 264/273, 274, 264/275, 276, 277, 263, 255, 250, 271.1, 259

[56] References Cited

U.S. PATENT DOCUMENTS

| | | | |
|---|---|---|---|
| 3,549,477 | 12/1970 | Burgman | 264/263 |
| 4,855,807 | 8/1989 | Yamaji et al. | 357/72 |
| 5,030,116 | 7/1991 | Sakai . | |

FOREIGN PATENT DOCUMENTS

| | | |
|---|---|---|
| 840041 | 7/1960 | United Kingdom . |
| 1433135 | 4/1976 | United Kingdom . |

*Primary Examiner*—Jan H. Silbaugh
*Assistant Examiner*—Angela Ortiz
*Attorney, Agent, or Firm*—Sughrue, Mion, Zinn, Macpeak & Seas

[57] ABSTRACT

A metal elements-resin insert is produced by holding metal elements such as conductive bus bars 8 and the like in a forming cavity 5 of a mold assembly 3, 4 by a support pin 6 projecting in the mold assembly 3, 4. The metal elements 8 embedded in a resin material can overcome problems of corrosion and electrical short-circuit in which the metal elements contact with air or moisture entering through drawn holes 7 formed by support pin 6 into the resin material and can improve the moisture and air proof function. The resin insert is produced by: predeterminately forming preformed portions 13 which embed a main portion of the metal elements 8 in a resin material 1 and have a support pin aperture 7 which does not reach the metal elements 8 and adapts to receive a top end of the support pin 6 and have a positioning protrusion 15 which adapts to contact with the inner wall of the forming cavity 5; inserting the metal elements 8 with the preformed portions 13 into the forming cavity 5 so that the preformed portions 13 are pinched in the cavity between the support pin 6 received in the support pin aperture 7 and the positioning protrusion 15; and pouring a molten resin material into the forming cavity 5 so that the metal elements with the preformed portions are embedded in the resin material 1.

8 Claims, 5 Drawing Sheets

METHOD FOR PRODUCING A METAL ELEMENTS-RESIN INSERT, A CONNECTOR BLOCK FOR INJECTORS, AND A METHOD FOR PRODUCING THE CONNECTOR BLOCK

This is a Continuation of application No. 07/825,594, filed Jan. 24, 1992, now abandoned.

BACKGROUND OF THE INVENTION

1. Field of the Invention

This invention generally relates to a method for producing a metal elements-resin insert, a connector block for injectors, and a method for producing the connector block for injectors, and more particularly to a metal elements-resin insert part such as an electrical wiring part for an automotive vehicle and the like and its producing method in which conductive metal elements are embedded in a resin material.

2. Description of the Prior Art

An example of a prior art method for producing a metal elements-resin insert, which is utilized in producing electrical wiring parts for an automotive vehicle, will be explained with reference to FIGS. 4A and 4B. FIG. 4A is a cross sectional view of a mold assembly for carrying out the prior art method. FIG. 4B is a cross sectional view of a produced part.

In the prior art method for producing the resin insert, when a conductive metal element 8 is embedded in a resin material 1, the metal element 8 to be inserted is pinched and held in the insert position by a pair of support pins 61 and 62 projecting into a forming cavity 50 of a mold assembly comprising a pair of upper and lower molds 31 and 32. Then, a molten resin material is poured into the forming cavity 50 and solidified therein. Produced insert 2 is taken out of the mold by disconnecting the upper mold 31 and the lower mold 32 from each other and drawing the pins 61 and 62 from the insert 2.

In the prior art method as mentioned above, since the metal element 8 is pinched by the pins 61 and 62 projecting in the upper and lower molds 31 and 32 and embedded in the resin material, drawn holes 17 caused by the support pins 61, 62 remain in the produced insert and the drawn holes 17 reach the surface of the metal element 8 (see FIG. 4B). Even if the drawn holes 17 are filled with the same resin, the surfaces of the metal element 8 have been immediately in contact with air or moisture and the filled holes are often inferior in moisture sealing capabilities. Consequently, the metal element 8 is subjected to corrosion or electrical short-circuit.

SUMMARY OF THE INVENTION

An object of the present invention is to provide a method for producing a metal elements-resin insert in which the metal elements embedded in a resin do not cause corrosion or electrical short-circuit.

Another object of the present invention is to provide a connector block for injectors equipped on an automotive vehicle, the whole construction of the block being simple and resistant to corrosion and breakage.

Still another object of the present invention is to provide a method for readily and reliably producing a connector block for said injectors.

In order to accomplish the above objects, the method for producing a metal elements-resin insert in accordance with the present invention, comprises the steps of:

first, temporarily holding the metal elements by support members made of an insulating material; and second, setting the metal elements held by the support members in a mold assembly with the support members contacting with the interior of the mold assembly and pouring molten resin into the mold assembly to form a metal elements-resin insert.

The connector block for injectors for an internal combustion engine in which a connecting portion and a plurality of injector coupling portions are integrally formed, in accordance with the present invention, comprising:

a plurality of conductive elements extending from the connecting portion to the injector coupling portions;

a support member holding the conductive elements in an insulation relation with each other; and a resin cover member covering the conductive elements and the support member and extending from the connecting portion to said injector coupling portions.

Another connector block for injectors for an internal combustion engine in which a connecting portion to be connected to a wire harness and a plurality of injector coupling portions spaced at a predetermined distance are integrally formed, in accordance with the present invention, comprises:

a plurality of conductive elements extending from the connecting portion to the injector coupling portions;

a support member each provided on at least the injector coupling portions and the connecting portion for supporting the conductive elements so as to be insulated from each other;

a resin cover member covering the conductive elements and the support member and extending from the connecting portion to the injector coupling portions.

The method for producing a connector block for injectors for an internal combustion engine in which a connecting portion and a plurality of injector coupling portions are integrally formed, in accordance with the present invention, comprises the steps of:

first, preparing a plurality of conductive elements extending from the connecting portion to said injectors coupling portions;

second, positioning and holding the conductive elements in place at a predetermined combination position by support members; and third, setting the conductive elements held by said support members in a forming cavity with the support members contacting with the interior of the forming cavity to form a conductive element-resin insert.

In accordance with the production method of the present invention, the preformed resin portions having a support pin aperture which does not reach the metal elements and the positioning protrusion are predeterminately formed by partially embedding the metal elements in the resin. The metal elements with the preformed portions are inserted into and held in the forming cavity and then a molten resin is poured into the forming cavity to embed the metal elements with the preformed portions in the resin. By these steps, there remains an insulation layer between the metal elements and the bottom of the support pin aperture formed in the resin insert. Accordingly, the insulation layer formed by the preforming step can cut off external air and moisture from the metal elements to keep them water-proof and air-sealed.

The metal elements with the preformed portions are held in the forming cavity at the desired inserted position by the support pin on the mold which is inserted into the support pin aperture and the positioning protrusion on the preformed portions which contacts with the inner wall of the forming cavity. Consequently, the step of embedding the metal elements with the preformed portions in the resin can be smoothly carried out. Also, the positioning of the metal elements becomes more precise and stable.

DETAILED DESCRIPTION OF THE PREFERRED EMBODIMENTS

Figure 2A:
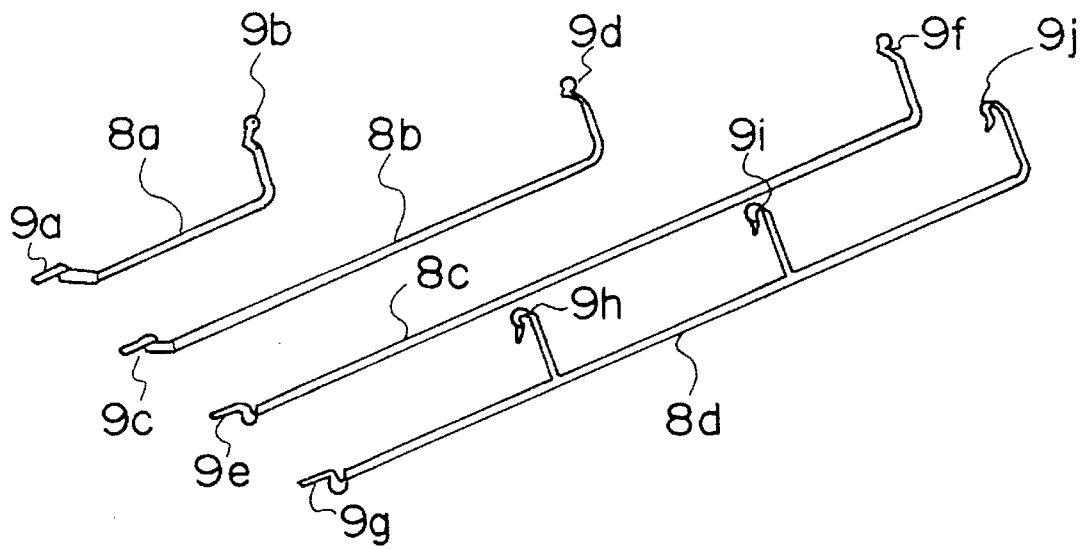
FIGS. 2A to 2C are perspective views showing the respective steps for producing a connector block for injectors of this invention.
Figure 2B:
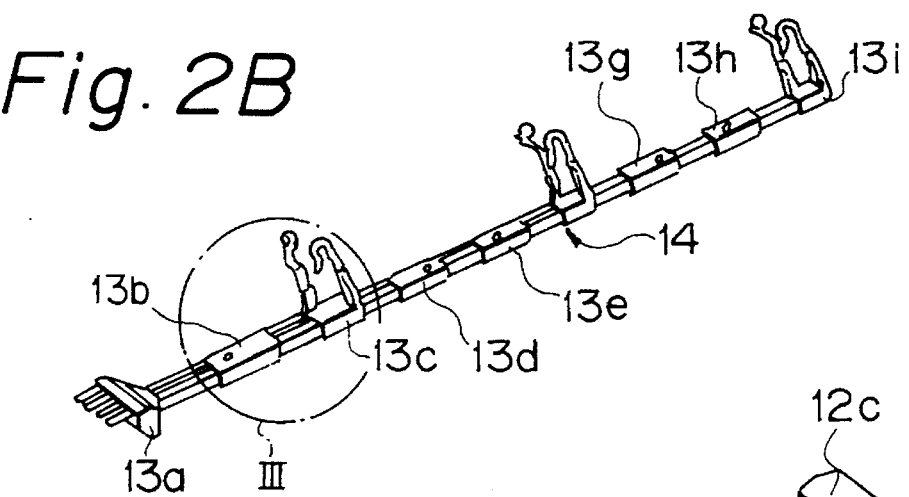
Figure 2C:
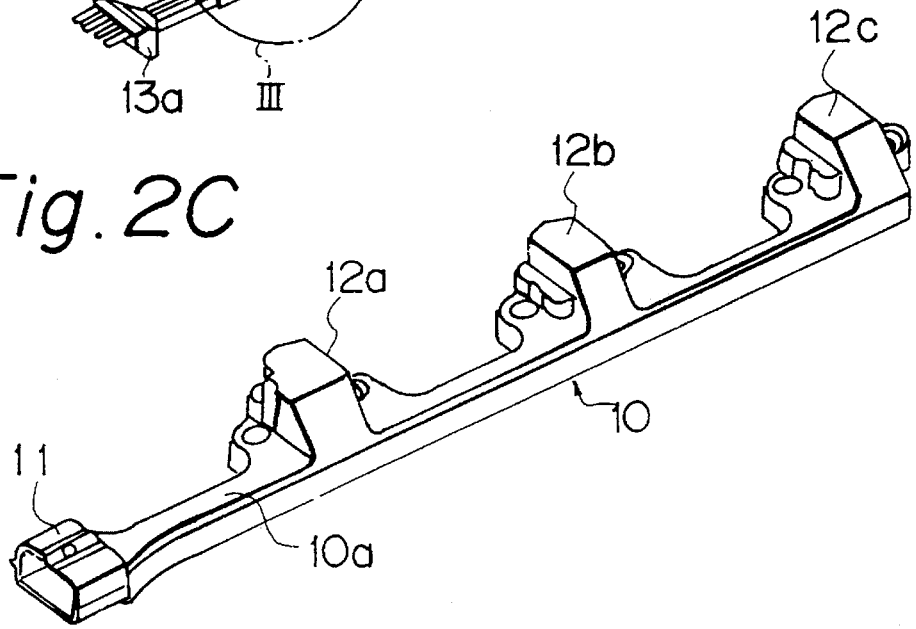
Figure 3:
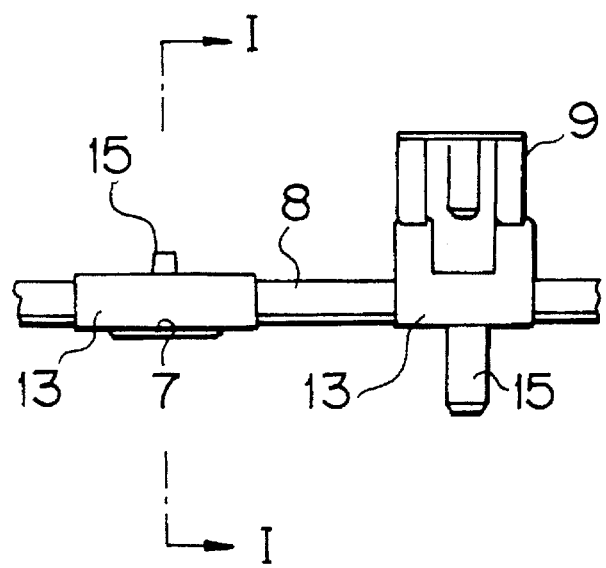
FIG. 3 is an enlarged side view encircled by a circle III in FIG. 2B.
Figure 4A:
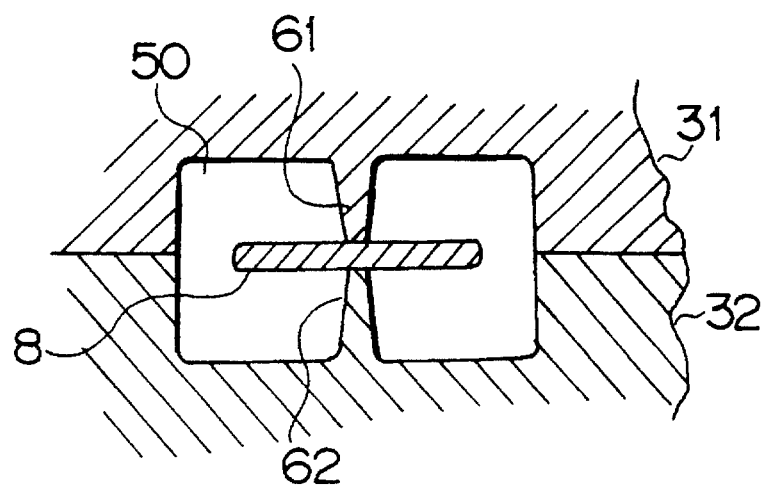
FIGS. 4A and 4B are schematic explanatory views of the producing method of the prior art.
Figure 4B:
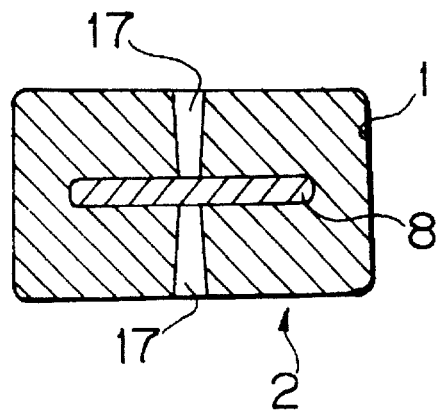

Referring to FIGS. 1 to 3, embodiments of a method for producing a metal elements-resin insert and a connector block for injectors and a method for producing the block will be explained below.

The present invention is applied to a connector block for injectors for an internal combustion engine of an automotive vehicle. FIGS. 1A to 1H show steps of producing the connector block for injectors, respectively.

First, a construction of the connector block for injectors is explained. FIG. 2C shows a finished connector block 10 for injectors. The connector block 10 for injectors has a connector portion 11 and an injector coupling portion 12. The injector coupling portion 12 includes three injector coupling portions 12a, 12b, and 12c. The connector block 10 for injectors is formed from a resin material into a shape shown in FIG. 2C. The connector portion 11, the injector coupling portion 12, and a bar-like connecting portion 10 a coupling them are formed from the same resin. The connector portion 11 is connected to a wire harness not shown. The injector coupling portion 12 is connected to a connector of injectors not shown.

FIGS. 2A and 2B show an internal construction of the connector block 10 for injectors, respectively. A metal bus bar 8 extending from the connector portion 11 to each of the injector coupling portions 12a, b, c is set in the connector block 10 for injectors. The bus bar 8 includes four bus bars 8a, 8b, 8c and 8d. The bus bar 8 is provided with a terminal 9 which is exposed at the connector portion 11 and the injector coupling portion 12. The bus bar 8a extends from the connector portion 11 to the injector coupling portion 12a and is provided with a terminal 9a on the connector side and a terminal 9b on the injector side. The bus bar 8b extends from the connector portion 11 to the injector coupling portion 12b and is provided with a terminal 9c on the connector side and a terminal 9d on the injector side. The bus bar 8c extends from the connector portion 11 to the injector coupling portion 12c and is provided with a terminal 9e on the connector side and a terminal 9f on the injector side. The bus bar 8d branches from the connector portion 11 to each of the injector coupling portions 12 and is provided with a terminal 9g on the connector side and terminals 9h, 9i, and 9j.

The bus bar 8 is disposed in place in the combination position as shown in FIG. 2B. A bundle of bus bars 14 have a plurality of preformed portions. The preformed portions serve to support each of the bus bars 8 at a given distance so that the bus bars do not come into contact with each other. There are nine preformed portions 13a, b, c, d, e, f, g, h, and i. The preformed portions 13a, 13c, 13f, and 13i are formed in correspondence with the connector portion 11 and the injector coupling portions 12a–c, respectively. The preformed portions 13c, 13f, and 13i are integrally provided with a positioning protrusion 15 shown in FIG. 3. The preformed portions 13b, 13d, 13e, 13g, and 13h are integrally provided with a support pin aperture 7 and a positioning protrusion 15. These preformed portions 13a–c support the bus bars 8 in place in series of preforming cavities in a preforming mold assembly comprising an upper mold 18 and a lower mold 19 as shown in FIG. 1B so that a part of the bus bars 8 is set in the preforming cavity. The bundle of the bus bars 14 shown in FIG. 2B is set in a forming cavity of a mold assembly comprising an upper mold 3 and a lower mold 4 as shown in FIG. 1G and then formed into a product having a shape shown in FIG. 2C.

In FIGS. 1 and 3, the reference numbers of each of the parts in the preformed portions 13a, b, . . . i are shown only by the numerals and the suffix letters a, b, . . . i are deleted.

The connector block 10 for injectors having the above-mentioned construction operates as below. Electrical signals from a control circuit not shown are applied to the connector portion 11 and transmitted through the bus bar 8 to the injector coupling portions 12. The electrical signals are transmitted from the injector coupling portions 12 to each of injectors not shown to drive it. Thus, the injector acts to supply a fuel to an internal combustion engine in response to the electrical signals from the control circuit.

Next, the steps of producing the connector block 10 for injectors are explained below.

The four bus bars 8 shown in FIG. 2A are formed from a metal plate by a press.

Figure 1A:
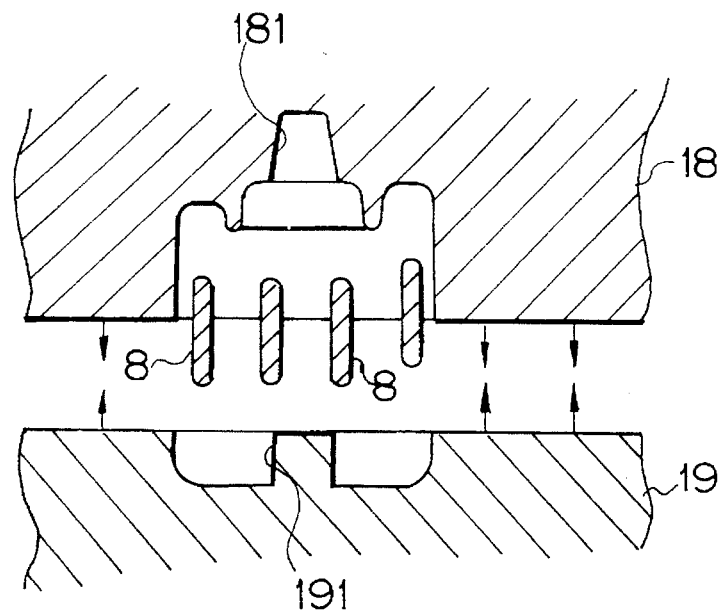
FIGS. 1A to 1H are schematic explanatory views of the respective steps showing a producing method of this invention.
Figure 1B:
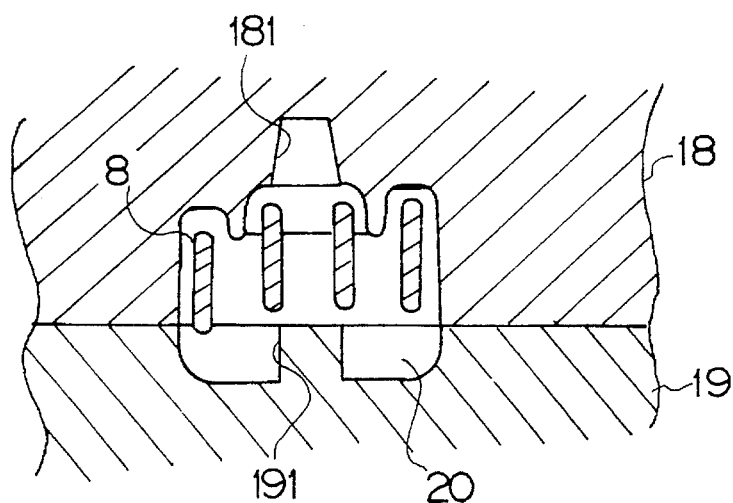
Figure 1C:
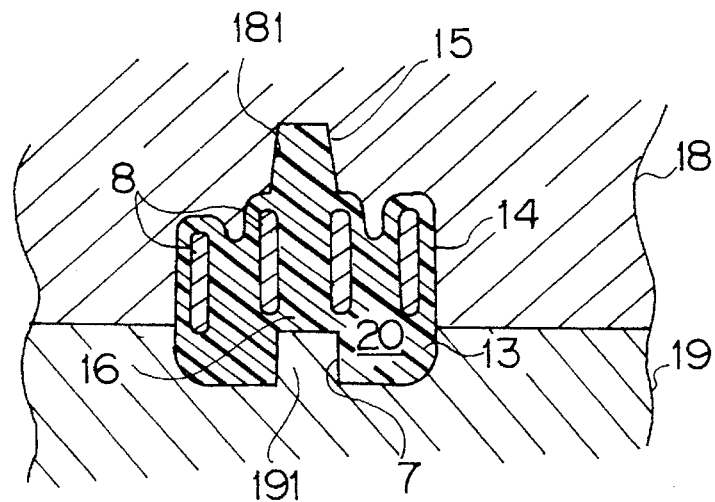
Figure 1D:
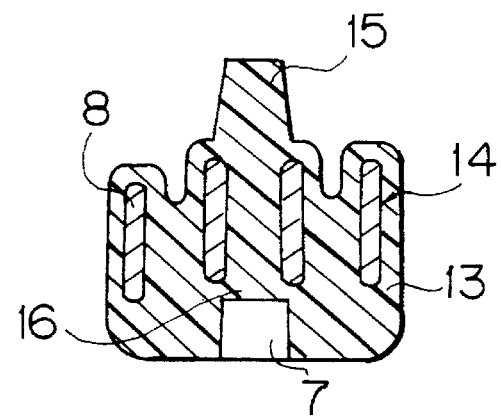

A preforming mold assembly is prepared for forming (FIG. 1A). The assembly comprises the upper preforming mold 18 and the lower preforming mold 19 which have a series of preforming cavities corresponding to the preformed portions 13 shown in FIG. 2B. The four bus bars 8 are fixed in place (FIG. 1A) and the upper and lower molds 18 and 19 are coupled with each other so that the molds enclose the bus bars 8 (FIG. 1B). The molten resin is injected into the preforming cavity 20 to integrally make the nine preformed portions 13 (FIG. 1C). FIG. 1D shows a cross sectional view of a semiproduct.

FIG. 1 is a cross sectional view taken along line I—I of FIG. 3. The preforming cavity 20 is defined between the upper and lower preforming molds 18 and 19 (FIG. 1B). The upper preforming mold 18 is provided with a hole 181 for the positioning protrusion 15. The lower preforming mold 19 is provided with a protrusion 191 for the support pin aperture 7. The height of the protrusion 191 is designed, so that the support pin aperture 7 does not reach the surface of the bus bar 8 and the insulation layer 16 remains between the bus bar 8 and the bottom of the aperture 7. The bundle of the bus bars 14 shown in FIG. 2B is made by the preforming step.

Figure 1E:
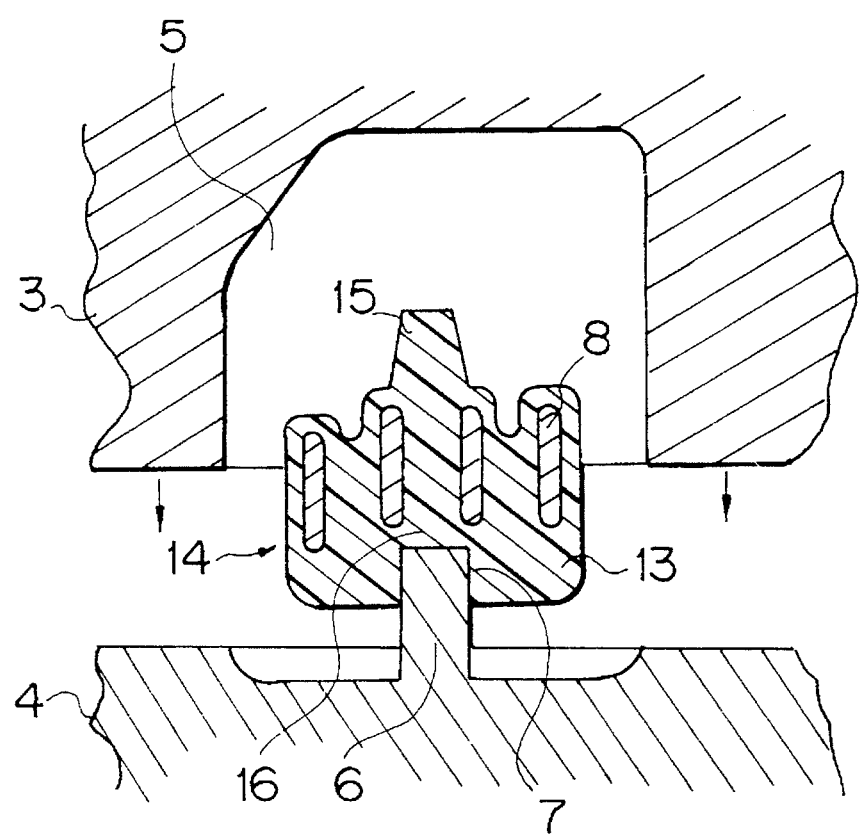

The bundle of the bus bars 14 is fixed in the mold assembly having the forming cavity 5 corresponding to the shape shown in FIG. 2C. As shown in FIG. 1E, the mold assembly comprises the upper mold 3 and the lower mold 4. The lower mold 4 is provided with the support pin 6 to be inserted into the support pin aperture 7 formed in the preformed portions 13.

Figure 1F:
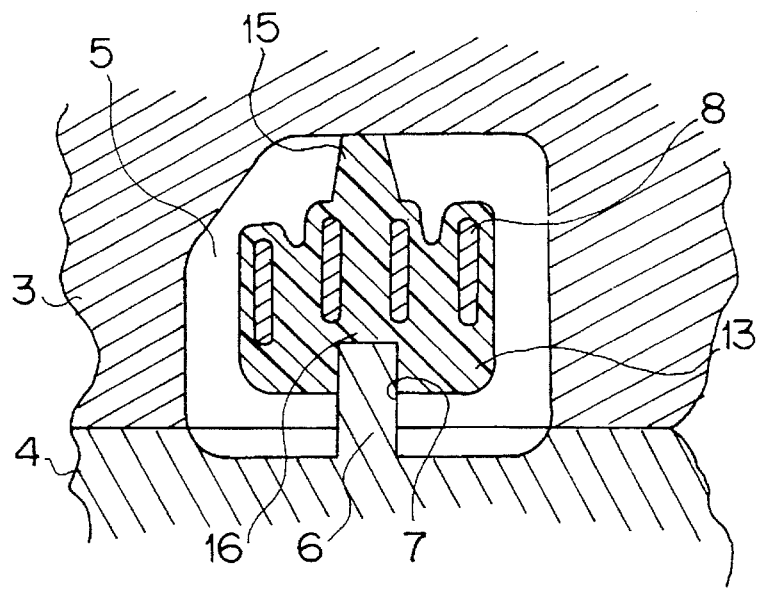
Figure 1G:
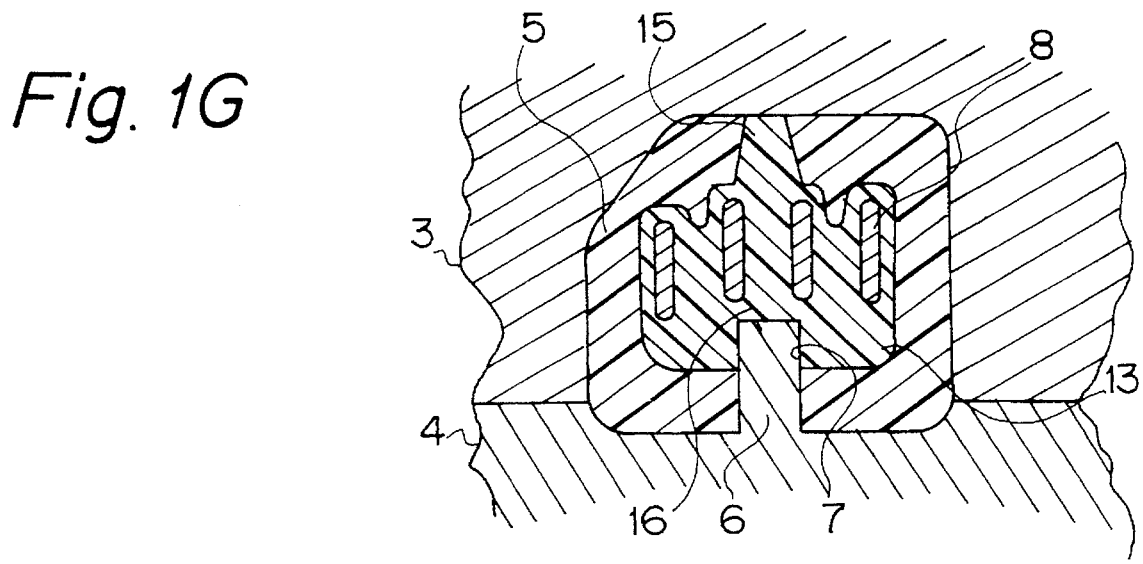
Figure 1H:
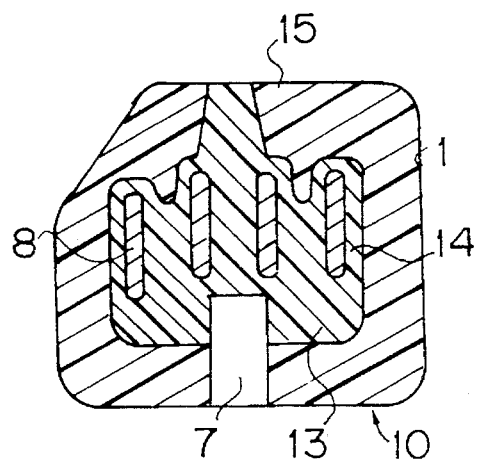

As shown in FIG. 1E, the support pin 6 of the lower mold 4 is received in the support pin aperture 7 of the bundle of the bus bar 14, so that the bundle of the bus bar 14 is supported on the lower mold 4. Then the upper mold 3 descends on the lower mold 4 and the upper and lower molds 3 and 4 are coupled with each other to enclose the bundle of the bus bar 14 therein (FIG. 1F). The bundle of the bus bar 14 is held in the forming cavity 5 with the positioning protrusion 15 contacting with the cavity 5 and with the pin 6 inserting into the aperture 7. The connector block 10 for injectors is formed in the cavity 5 by injecting the molten resin 1 (FIG. 1G). FIG. 1H shows the cross sectional view of the connector block 10 for injectors in the finished state.

The resin used in the preformed portions 13 may be selected from a resin material which has a good adhesive property to the main resin 1.

The positioning protrusions 15 and the support pin apertures 7 may be distributed over the entire length of the bundle of the bus bar 14. However, it will be preferable that the support pin is formed on the lower mold 4 and the support pin aperture 7 is formed on the bottom of the preformed portions 13 in order to easily secure the bundle of the bus bar 14 to the mold assembly.

The connector block 10 for injectors described above has a simple construction and can be readily produced. The bus bar 8 is free from corrosion since the bus bar 8 is exposed in only the connector portion 11 and the injector coupling portion 12 and almost all portions of the bar are covered with the preformed portions 13 and the resin 1. Further, the bus bars 8 are prevented from short-circuiting with each other since the bus bars 8 are positioned by the preformed portions 13 before insert-forming. A plurality of the preformed portions make the positioning of the bus bars more precise. In addition, the positioning of the bus bars and the prevention of the short-circuit can be certainly effected since the preformed portions are provided on the turn portions or the complicated portions of the bus bars in the connector portions and injector coupling portions.

Although the embodiments explained above are applied to the connector block for injectors for an internal combustion engine for an automotive vehicle, it should be noted that the present invention is not limited to the above embodiments. The present invention may be generally applied to any method for producing a resin insert in which metal elements are embedded in a resin material.

An embodiment of the method for producing a resin insert, with reference to FIGS. 1 to 3, comprises the steps of: first temporarily holding the metal elements (8) by support members (13) made of an insulating material; and second setting the metal elements (8) held by the support members (13) in a mold assembly (3, 4) with the support members (13) contacting with the interior of the mold assembly (3, 4) and pouring molten resin into the mold assembly to form a metal elements-resin insert.

In accordance with the present invention, the metal elements embedded in the resin can have higher degrees of moisture-proofing and air-sealing, and be free from corrosion and short-circuit. Thus the quality of the resin-insert product can be improved.

What is claimed is:

1. A method for producing a connector block for injectors for an internal combustion engine in which a connecting portion and a plurality of injector coupling portions are integrally formed, comprising the steps of:

first, preparing a plurality of conductive elements extending from said connecting portion to said injector coupling portions;

second, injection molding support members around portions of said conductive elements and thereby positioning and holding said conductive elements in place at a predetermined position, said support members having a support pin aperture formed therein which does not extend to said metal elements and is adapted to receive a top end of a support pin projecting in a forming cavity, said preformed portions also having a positioning protrusion which is adapted for contact with an inner wall of said forming cavity; and third, setting said conductive elements held by said support members in the forming cavity with a top end of said support pin being received in said support pin aperture and said positioning protrusion contacting with the inner wall of the forming cavity and injecting resin in the forming cavity to form a connector block.

2. A method for producing a metal elements-resin insert as set forth in claim 1, wherein said metal elements are a plurality of elongated conductive elements.

3. A method for producing a connector block for injectors as set forth in claim 1, wherein said support members are disposed at predetermined positions on said conductive elements so as to position said conductive elements relative to one another.

4. A method of producing a connector block for supplying electric signals to a plurality of electric devices through a plurality of conductive metal elements embedded in a resin material, said method comprising steps of:

placing said conductive metal elements in place within a first cavity of a first mold assembly;

injecting molten resin into said first cavity of said first mold assembly to preform a plurality of support members at a plurality of positions and hold said conductive metal elements fixedly by said support members at said plurality of positions;

removing said fixedly held conductive metal elements from said first mold assembly and placing said removed conductive metal elements and said support members in place within a second cavity of a second mold assembly; and injecting molten resin into said second cavity of said second mold assembly to embed said conductive metal elements and said support members substantially wholly within said molten resin wherein said first mold assembly is provided with a protrusion extending into said first cavity and a hole forming a part of said first cavity so that after said first injecting step at least one of said support members is provided with a support pin aperture and a positioning protrusion corresponding to said protrusion and said hole, respectively, wherein said second mold assembly is provided with a support pin extending into said second cavity, and wherein said removing and placing step includes a step of engaging said support pin aperture of said support member with said support pin of said second mold assembly to support said support member in said second cavity with said positioning protrusion of said support member in contact with an inner wall of said second mold assembly.

5. A method according to claim 4, wherein said conductive metal elements comprise bus bar portions of different bar lengths, first terminal portions at one ends of said respective bus bar portions, and second terminal portions at least at the other ends of said respective bus bar portions, wherein said placing step includes a step of placing said bus bar portions in parallel to each other and said first terminal portions at the same position so as to receive said electric signals at said first terminal portions and supply said received electric signals to said electric devices from said second terminal portions through respective bus bar portions, and wherein said first injecting step preforms said support member around said bus bar portions.

6. A method according to claim 5, wherein said second injecting step forms an outer block which wholly covers said support members and said conductive metal elements except for end portions of said first and second terminal portions at which said electric signals are received and supplied.

7. A method according to claim 6, wherein said second terminal portions are shaped to be connectable to fuel injectors of an internal combustion engine which forms said electric devices.

8. A method of producing a connector block for supplying electric signals to a plurality of electric devices through a plurality of conductive metal elements embedded in a resin material, said method comprising steps of:

injecting molten resin into a first cavity of a first mold assembly to preform a plurality of support members for said conductive metal elements;

fixedly holding said conductive metal elements in a bundle at a plurality of spaced positions by said support members so that said conductive metal elements extend parallel to one another;

placing said held conductive metal elements bundle in position within a second cavity of a second mold assembly, said second cavity being in a shape which corresponds to said connector block and enables said support members to contact an inner wall of said second mold assembly only at plural locations; and injecting molten resin into said second cavity of said second mold assembly to substantially cover all of said conductive metal elements and said support members by said injected molten resin except for portions thereof at which said electric signals are received and supplied to said electric devices wherein said first mold assembly is provided with a protrusion extending into said first cavity and a hole forming a part of said first cavity so that after said first injecting step at least one of said support members is provided with a support pin aperture and a positioning protrusion corresponding to said protrusion and said hole, respectively, wherein said second mold assembly is provided with a support pin extending into said second cavity, and wherein said removing and placing step includes a step of engaging said support pin aperture of said support member with said support pin of said second mold assembly to support said support member in said second cavity with said positioning protrusion of said support member in contact with an inner wall of said second mold assembly.

* * * * *